(12) United States Patent
Goodzeit (10) Patent No.: US 7,791,229 B2
(45) Date of Patent: Sep. 7, 2010

(54) LOW HEAT LEAK, HIGH TORQUE POWER SHAFT FOR CRYOGENIC MACHINES

(76) Inventor: Carl L. Goodzeit, 1409 Yardley Pl., DeSoto, TX (US) 75115

(*) Notice: Subject to any disclaimer, the term of this patent is extended or adjusted under 35 U.S.C. 154(b) by 169 days.

(21) Appl. No.: 12/217,304

(22) Filed: Jul. 3, 2008

(65) Prior Publication Data

US 2009/0251014 A1 Oct. 8, 2009

Related U.S. Application Data

(60) Provisional application No. 61/041,673, filed on Feb. 4, 2008.

(51) Int. Cl.
*H02K 9/10* (2006.01)
(52) U.S. Cl. ........................................ 310/52
(58) Field of Classification Search ............. 310/52–54, 310/64
See application file for complete search history.

(56) References Cited

U.S. PATENT DOCUMENTS

| | | | |
|---|---|---|---|
| 3,469,121 A | | 9/1969 | Smith, Jr. |
| 3,564,307 A | | 2/1971 | Kawabe et al. |
| 3,639,793 A | | 2/1972 | Appleton et al. |
| 3,648,082 A | * | 3/1972 | MacNab et al. ............... 310/10 |
| 3,657,580 A | | 4/1972 | Doyle |
| 3,942,053 A | * | 3/1976 | Abolins et al. ................ 310/52 |
| 3,944,865 A | | 3/1976 | Jewitt |
| 4,018,059 A | | 4/1977 | Hatch |
| 4,039,870 A | * | 8/1977 | Sterrett ........................ 310/52 |
| 4,152,609 A | * | 5/1979 | Cooper et al. ................ 310/52 |
| 4,174,483 A | * | 11/1979 | Vinokurov et al. ............ 310/52 |
| 4,275,323 A | | 6/1981 | Hartch |
| 4,278,905 A | | 7/1981 | Chari et al. |

(Continued)

FOREIGN PATENT DOCUMENTS

JP 60-026459 2/1985

(Continued)

OTHER PUBLICATIONS

AD. Appleton, "Design and Manufacture of a Large Superconducting Homopolar Motor (and Status of Superconducting AC. Generator)," IEEE Transactions on Magnetics, vol. Mag.-19, No. 3, May 1983.

(Continued)

*Primary Examiner*—Dang D Le
(74) *Attorney, Agent, or Firm*—Hemingway & Hansen, LLP; D. Scott Hemingway (57) ABSTRACT

A shaft assembly and method for reducing the heat leak into the cryogenic region of a superconducting electrical machine comprising a rotor shaft extension assembly capable of transmitting large amounts of torque with substantially increased thermal impedance. The shaft assembly contains a plurality of concentric structural cylinders composed of high strength, low thermal conductivity structural materials. The structural cylinders are connected in series by means of welded joints or strong interlocking "finger" connections, in such a way that the coldest cylinder is connected to the cryogenic machine. An optional intermediate heat sink that allows the shaft extension member to rotate freely within the confines of the heat sink further reduces the heat leak into the cryogenic environment. Splined adapter hubs are typically used to connect the cylinder assembly to the rotor of the superconducting machine and the external device.

27 Claims, 4 Drawing Sheets

U.S. PATENT DOCUMENTS

| | | | |
|---|---|---|---|
| 4,385,246 | A | 5/1983 | Schur et al. |
| 4,816,709 | A | 3/1989 | Weldon |
| 4,882,509 | A | 11/1989 | Wottlin |
| 5,032,748 | A | 7/1991 | Sakuraba et al. |
| 5,144,179 | A | 9/1992 | Hilal et al. |
| 5,250,861 | A | 10/1993 | Cummins |
| 5,723,925 | A | 3/1998 | Kambe et al. |
| 6,140,719 | A * | 10/2000 | Kalsi .................. 310/52 |
| 6,359,365 | B1 | 3/2002 | Kalsi |
| 6,412,289 | B1 | 7/2002 | Laskaris et al. |
| 6,597,082 | B1 | 7/2003 | Howard et al. |
| 6,700,274 | B2 | 3/2004 | Gamble et al. |
| 6,856,062 | B2 | 2/2005 | Heiberger et al. |
| 7,049,724 | B2 | 5/2006 | Qu et al. |
| 2006/0028085 | A1 | 2/2006 | Qu et al. |
| 2006/0279164 | A1 | 12/2006 | Blum |
| 2007/0085427 | A1 | 4/2007 | Sivasubramaniam et al. |
| 2007/0120435 | A1 | 5/2007 | Laskaris et al. |

FOREIGN PATENT DOCUMENTS

| | | |
|---|---|---|
| JP | 63-305746 | 12/1988 |
| JP | 08-308211 | 11/1996 |
| JP | 2003-070227 | 3/2003 |
| WO | WO 95/08211 | 3/1995 |
| WO | WO 2009/145835 A3 | 12/2009 |

OTHER PUBLICATIONS

Michael J. Superczynski and Donald J. Waltman "Homopolar Motor with High Temperature Superconductor Field Windings," IEEE Transactions on Applied Super Conductivity, vol. 7, No. 2, Jun. 1997.

R.J.T Home, W. Creedon, M. Reed, E. Bowles and K. Schovbel "Homopolar Motor Technology Development".

R.A. Ackermann, R.L. Rhodenizer and C.D. Ward, "A superconductive Field Winding Subsystem for a 3000 HP Homopolar Motor," IEEE Transactions on Magnetics, vol. Mag. 13, No. 1, Jan. 1997.

A. Arkkio, P. Bergiund, J.T. Eriksson, J. Loumi and M. Savelaiven "A 50 KW Homopolar Motor With Superconducting Field Windings," IEEE Transactions on Magnetics, vol. Mag-17, No. 1, Jan. 1981.

Unknown author, "Bush Seals", Internet Article, p. 1 of 1, date unknown.

International Searching Authority: Notification of Transmittal of International Search Report, Written Opinion of Int'l Searching Authority, or the Declaration dated Dec. 7, 2009.

International Searching Authority: International Search Report Report dated Dec. 7, 2009.

International Searching Authority: Written Opinion of the International Searching Authority dated Dec. 7, 2009.

* cited by examiner

LOW HEAT LEAK, HIGH TORQUE POWER SHAFT FOR CRYOGENIC MACHINES

RELATED APPLICATION DATA

This application is related to Provisional Patent Application Ser. No. 61/041,673 filed on Apr. 2, 2008, and priority is claimed for these earlier filings under 35 U.S.C. §119(e). The Provisional Patent Application is also incorporated by reference into this utility patent application.

TECHNICAL FIELD OF THE INVENTION

This invention relates to a cryogenic machine heat sink associated with a rotating shaft assembly.

BACKGROUND OF THE INVENTION

In order to get optimal performance from a superconducting electrical machine, it is important to minimize the heat leak into the system in order to maintain the required cryogenic environment. The rotating shafts that connect the cryogenic electrical machines to non-cryogenic external devices are potential major paths for transmitting heat from the external environment into the cryogenic system. Any seals and bearings used in the rotor system can also degrade the cryogenic environment because of wear and friction.

The dynamic stability of a rotating system is difficult to maintain, especially when the rotating system contains a free flowing cryogenic fluid associated with a rotating shaft in a superconducting machine. Rotating cryogenic leak-tight seals have inherent problems associated with them, such as surface friction. Surface friction is caused by surfaces that slide upon one another in extremely close contact to prevent leakages. Over time, the friction on these surfaces of the seal will cause it to wear away and eventually expand a gap in the seal. Because cryogenic temperatures are maintained in a superconducting machine, normal elastomer seals are not suitable for use to seal such gaps.

Stationary motion gap seals are also used to seal the interface around a rotating shaft. Such a gap seal is shown in U.S. Pat. No. 6,412,289. This gap seal is used with a multi-pole motor with a gas flow seal between the rotating and stationary components of the coupling. Non-contact clearance seals and magnetic fluid seals are used in this patent in conjunction with precision bearings and short overhang tubes with narrow relative motion gaps. This seal is very complex, and such complexity leads to failures should any one of these features fail or exceed tolerances. A gas seal is shown in U.S. Pat. No. 4,018,059, and an annular sealing arrangement is shown in WO/1995/008211, entitled Superconducting Rotor.

U.S. Pat. No. 6,700,274 (Gamble et al., March 2004) describes a rotor assembly for a superconducting electric machine that uses a cantilevered member to increase the path length and reduce the heat leak from the environment in a rotor-stator assembly for a superconducting synchronous machine. This application is limited to synchronous machines and incorporates the cantilever member as an integral part of the rotor assembly. Such a construction can also lead to structural failures in a high rotation cryogenic environment.

A major portion of the heat leakage into a superconducting machine can be associated with the thermal conduction of heat from the ambient temperature to the cryogenic region through the shaft that extends from the rotor to the external ambient temperature connection. The resistance to the flow of heat by thermal conduction in a structural member is a factor of: (a) the temperature difference between the warm and cold end of the member, (b) the thermal conductivity coefficients of the materials comprising the members, (c) the length of the members from their cold to the warm ends, and (d) the cross sectional area of the members. There is a need for a rotor shaft in a cryogenic machine that minimizes heat loss by enhancing these factors, but still maintains a sealed connection at the cryogenic and ambient temperature interfaces. This is especially important for high torque applications that require strong, large diameter rotor shafts.

SUMMARY OF INVENTION

The object of this invention is to provide an interface design that enables the transmission of large amounts of torque through the shafts of electric machines that use superconducting rotors, while lowering heat leak from the environment to the cryogenic system. The reduced heat leakage supports the cryogenic operating temperatures used with the superconducting materials. The invention is for a rotor shaft that serves as an extension to the rotor shaft of a cryogenic machine and substantially reduces the heat transmitted into the cryogenic environment of the machine. This extension rotor shaft uses a nested set of elongated cylindrical members, materials with a low thermal conductivity, members comprising materials of high structural strength, and optional intermediate temperature heat sinks, in a thermal insulating vacuum space. The invention allows the rotating shaft to operate at high torque with low heat leak and yet sustain the stresses encountered in the shaft without compromising the strength or rotation of the shaft. The invention reduces the heat flow through a rotating shaft by using a plurality of nested series-connected structural members for a given temperature difference between the warm and cold ends and a given torque transmission requirement.

The invention enables a cryogenic superconducting machine to operate with significantly improved efficiency and reliability, especially for high torque applications where substantial material cross sections are required in the shaft in order to deliver the required torque. The invention provides a generally more efficient and improved method of reducing the heat leak from the ambient temperature region to the cryogenic region of any superconducting machine.

This is accomplished by using a unique shaft extension from the cold rotor assembly of a superconducting machine into the ambient temperature region of an external device through an intermediate thermal insulating vacuum environment. The low heat leak assembly includes a large diameter, strong shaft for the transmission of large amounts of torque. The reduced heat leak also enables the superconducting machine to operate at a lower temperature and thus achieve improved performance and power density. This invention can reduce the size of the machine and the capacity of the refrigeration equipment necessary to maintain the machine at lower cryogenic operating temperatures.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

The present invention is a rotating shaft extension with a low heat leak, high torque capacity. The shaft extension contains a plurality of concentric cylinders. These cylinders are preferably made of a high strength and low thermal conductivity material (such as titanium alloy, high strength austenitic steel or other nickel based alloys) that remains ductile at the cryogenic temperature of the superconducting machine. For some applications a high strength filamentary reinforced plastic or composite material having a very high strength to thermal conductivity ratio may be preferred. Such materials include (but are not limited to) fiberglass reinforced plastic or carbon fiber reinforced plastic.

The shaft extension assembly includes adapter hubs at each end to connect to the electrical machine's rotor shaft and the shaft of the external device. In order to transmit the large amount of torque, these shafts and adapter hubs may be configured with splined connections. This shaft extension configuration provides significantly more thermal resistance while maintaining the mechanical strength needed for a high torque machine.

The invention uses a plurality of series-connected concentric structural cylinders that form a longer total path from the cold to the warm end of the rotor shaft extension than would be obtained with a single cylinder spanning the same distance. The series connection between adjacent cylinder layers occurs at a connector ring. Each cylinder may be enclosed by multi-layer thermal insulation to reduce heat transfer between layers at points other than the connector ring.

The connections between metallic members (such as shaft extension cylinders, connector rings, or adapter hubs) can be welded or fused metal joints since they must transfer the large amount of torque but, being of short length, are not required to have a low thermal conductivity. In embodiments of this invention with cylindrical members composed of high strength composite materials, such members can be connected to the connector rings or adapter hubs with interlocking joints as described in the explanation of FIG. 4. The metallic members can transmit large amounts of torque while maintaining an allowable working stress in the material.

Figure 3:
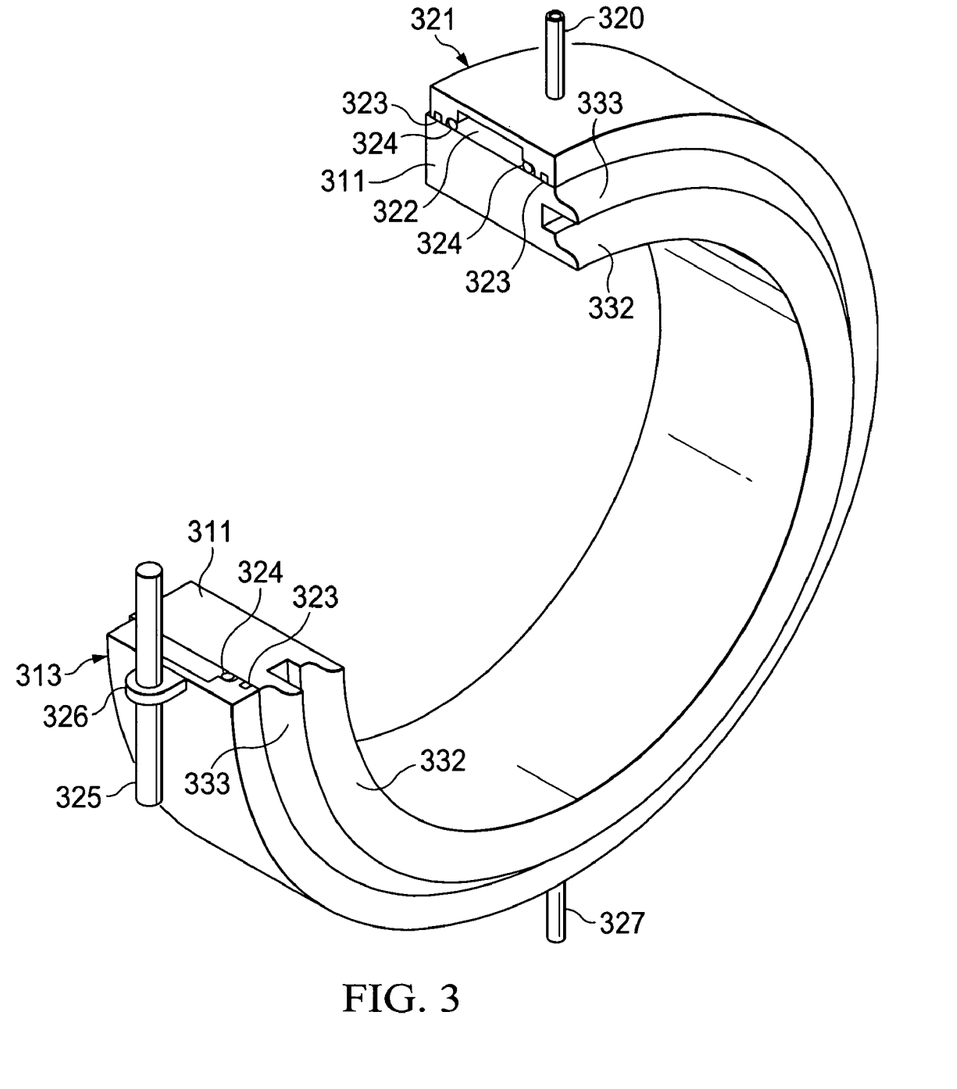
FIG. 3 is a cut-away view of a section of the connector ring used to make the series-connection between a pair of adjacent concentric cylinders.

An intermediate temperature heat sink assembly shown in FIG. 3 may be used on the shaft extension assembly in order to further control the heat leak into the cryogenic region and reduce it to a very low level. This technique is often used in the situation where a low temperature superconducting material (LTS) is used in the cryogenic region at temperature near the boiling point of liquid helium (i.e. ~4.3 K), but this solution can also be useful with high temperature superconducting (HTS) materials as well.

The efficiency of all superconducting materials (HTS and LTS materials) increases as operating temperatures lower, and thus a lower operating temperature can provide electrical machines of even higher power density. Furthermore, the intermediate temperature of the heat sink is usually provided by liquid nitrogen in the 77 K temperature region since this material in inexpensive and convenient to use. A heat sink may be set to any prescribed intermediate temperature by means of a cryocooler with a thermal conduction link to the heat sink assembly.

Figure 1:
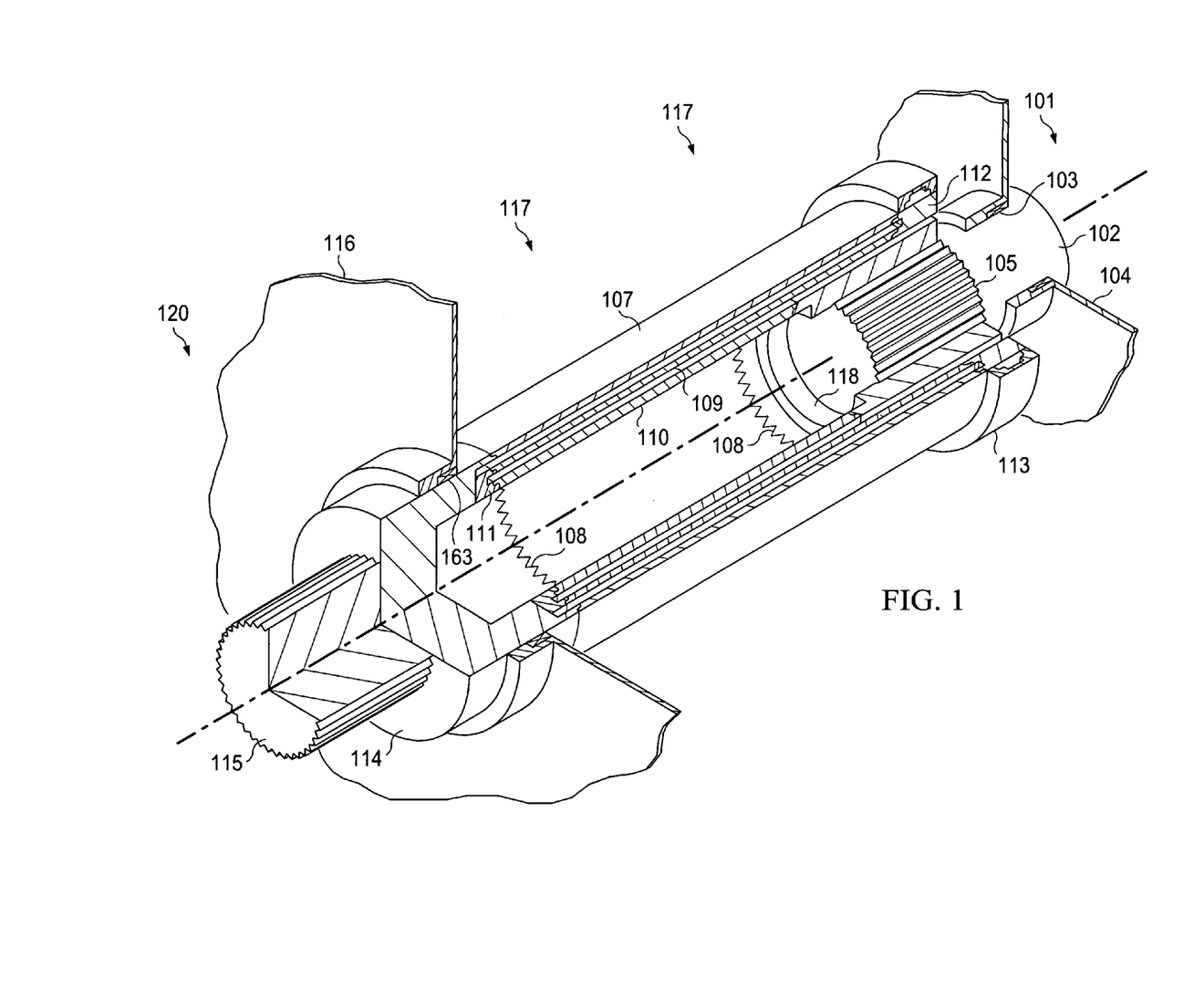
FIG. 1 is a cut-away view of the invention.

FIG. 1 is a first embodiment of a low heat leak, high torque capacity shaft extension. The embodiment of FIG. 1 uses 3 concentric cylinders, with the coldest cylinder layer of the shaft extension being the inner-most layer 110.

The rotor shaft 102 of the superconducting machine extends out of the cryogenic environment 101 through the enclosure 104 into the insulating vacuum space 117 where the shaft extension is located. A bearing and seal assembly 103 is required to prevent leakage of the cryogen into the insulating vacuum space 117 and provide a load carrying bearing to support the shaft 102 and allow it to rotate freely. In order to transmit the large amount of torque required for operation, the end of the rotor shaft 102 of the superconducting machine may be configured as a splined connection 105 that engages the adapter hub 118 of the shaft extension.

The inner most (coldest) cylinder 110 is connected to this adapter hub 118. The series connection between the inner most (coldest) cylinder 110 and its adjacent layer cylinder 109 is made at the connector ring 111 and the series connection between the middle layer cylinder 109 and the outer cylinder 107 is made at the connector ring 112. The other end of the outer cylinder 107 is connected to the adapter hub 114.

Metallic cylinders 107 and 109 that form the outer two cylindrical members of the shaft extension are welded to the connector rings 111,112 or adapter hub 114. The inner cylinder 110 of a non-metallic material is connected to the connector ring 111 and the adapter hub 118 by finger joints 108. As mentioned previously, the concentric cylinders 107, 109, and 110 may be wrapped with a multi-layer thermal insulation (not shown) to further reduce the heat leak of the assembly. In addition, a heat sink 113, shown at the connector ring 112 between the 2 outer cylinder layers, will further reduce the heat flow in the shaft extension.

Figure 2:
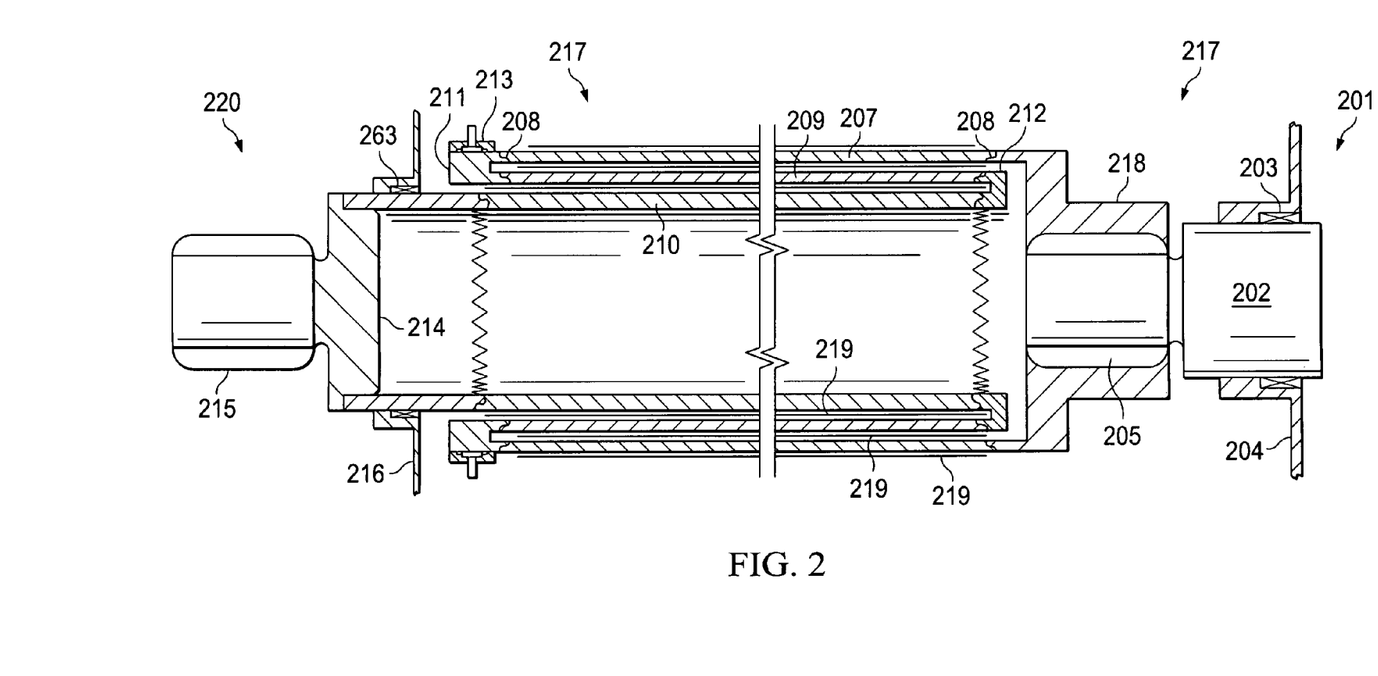
FIG. 2 is a cross section side view of the invention.

The warm end of the shaft extension has an adapter hub 114 that extends from the vacuum region 117 through the enclosure end 116 into the ambient temperature region 120. A bearing and seal assembly 163 is used to support the warm end of the shaft extension and allow it to rotate freely. The seal is provided to prevent leakage of ambient atmosphere 120 into the insulating vacuum 117. For efficient transmission of a large amount of torque, the portion of the adapter hub 114 extending into the ambient region 120 may be configured as a splined connection 115 to attach to the external device FIG. 2 is a second embodiment of the present invention. It uses 3 concentric cylinders, with the coldest cylinder layer of the shaft extension as the outer layer 207.

The rotor shaft 202 of the superconducting machine extends out of the cryogenic environment 201 through the enclosure 204 into the insulating vacuum space 217. A bearing and seal assembly 203 is required to prevent leakage of the cryogen into the insulating vacuum space 217 and provide a load carrying bearing to support the shaft 202 and allow it to rotate freely. In order to transmit the large amount of torque required for operation, the shaft end of the superconducting machine may be configured as a splined connection 205 that engages with splines of the adapter hub 218 on the shaft extension.

The coldest (outer) layer 207 of concentric cylinders is connected to the adapter hub 218 and makes a series connection to the middle layer cylinder 209 at the connector ring 211. A connector ring 212 makes the series connection between the middle layer cylinder 209 and the inner most cylinder 210. The other end of the inner cylinder 210 of the shaft extension is connected to an adapter hub 214. An optional heat sink 213 is positioned at the connector ring 211 for the cold outer cylinder 207.

Metallic cylinders 209 and 210 for the inner two cylindrical members of the shaft extension are welded to the connector rings 211, 212 and adapter hub 214. The outer (coldest) cylinder 207 of a non-metallic material is connected to the connector ring 211 and the adapter hub 218 by finger joints 208. As mentioned previously, the concentric cylinders 207, 209, and 210 may be wrapped with a multi-layer thermal insulation (indicated as 219) to further reduce the heat leak of the assembly.

The adapter hub 214 extends from the vacuum region 217 through the enclosure end 216 into the ambient temperature region 220 of the external device. A bearing and seal assembly 263 is used to support this warm end of the shaft extension and allow it to rotate freely. The seal is provided to prevent leakage of ambient atmosphere 220 into the insulating vacuum 217. For efficient transmission of a large amount of torque to or from the external device, the portion of the adapter hub 214 extending into the ambient region 220 may be configured as a splined connection 215 to attach to the external device.

FIG. 3 shows an example of a configuration for a heat sink assembly that may be used in conjunction with the embodiments of this invention; such a heat sink is shown as structure 113 or 213 in FIG. 1 and FIG. 2, respectively. The heat sink assembly is required to be mounted at a location where the prescribed heat sink temperature is to be imposed on the shaft extension assembly.

FIG. 3 shows the heat sink assembly 313 attached to the outer circumference of a connector ring 311. Two adjacent layers of concentric cylinders (not shown) comprising the shaft extension assembly would meet the connector ring 311 at the positions indicated by 332, 333. An exemplary heat sink assembly is a ring shaped structure 321 with a plenum volume 322 that can contain an intermediate temperature cryogen. The cryogenic fluid will then be in thermal contact with the connector ring 311 and tend to maintain it at a constant intermediate temperature.

The connector ring 311 must be free to rotate within the confines of the heat sink assembly 313 and therefore is provided with bearings 323 to allow connector ring 311 to rotate freely and seals 324 to prevent the intermediate temperature cryogen from leaking into the vacuum insulating volume that surrounds the shaft extension. The heat sink assembly may be provided with tubular connections 320 and 327 to admit and exhaust the intermediate cryogen from the plenum volume 322. The angular and axial positions of the heat sink assembly 313 may be fixed by means of low heat leak supports 325 that extend to the vacuum containment wall (not shown) and are anchored to the heat sink assembly by means of a stud 326.

Figure 4:
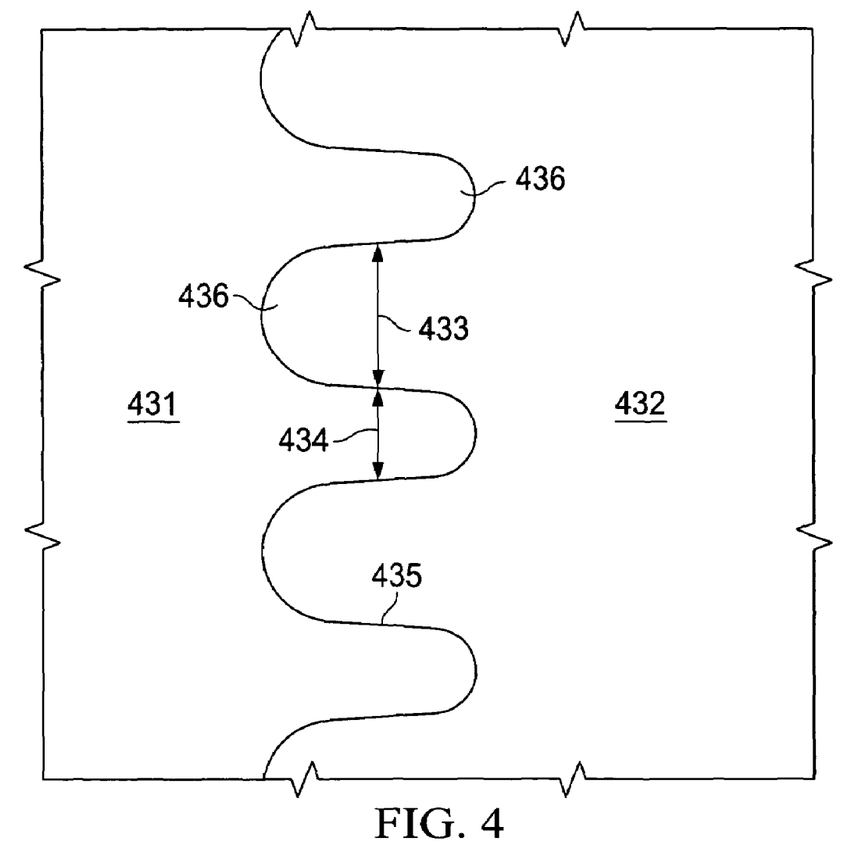
FIG. 4 is a cutaway view that shows the interlocking connection between two members of a shaft extension in the invention that are composed of materials not compatible for welding or joining by a metallic fusion method.

FIG. 4 shows a section of an interlocking joint for use between members of the shaft extension that cannot be joined by welding or a sufficiently strong bonding method. The interlocking joints between dissimilar materials permit the transmission of large amounts of torque between the members while maintaining allowable working stresses in the materials. The joints are shown by finger joints as 108 in FIG. 1 or as 208 in FIG. 2.

The joint may consist of interlocking "fingers" 436 between the two materials, a composite material 432 and a stronger metallic material 431. The relative width of the fingers where they contact may be adjusted to have differing widths 433 and 434 in order to provide relatively more area for the weaker material and thus optimize the strength of the joint. The shape of the fingers may be chosen so that the angle of contact 435 between the two members is substantially parallel to the axis of rotation of the shaft in order to minimize the thrust that would tend to separate the joint.

While the present invention has been particularly shown and described with respect to preferred embodiments, it will be readily understood that minor changes in the details of the invention may be made without departing from the spirit of the invention.

I claim:

1. A rotating shaft assembly for a cryogenic electrical machine comprising:

a first adapter hub that can be coupled to a rotor shaft and a second adapter hub that can be coupled to a drive shaft that transmits rotational torque between the machine to an external device, each of said first and second adapter hubs being located at opposite ends of the rotating shaft extension assembly along a longitudinal axis of said rotating shaft extension assembly, a plurality of series-connected concentric cylinders each having a longitudinal axis positioned in alignment with the longitudinal axis of the rotating shaft assembly, said concentric cylinders being located between said rotor shaft of a superconducting machine and said drive shaft that transmits rotational torque for the machine, said plurality of concentric cylinders also being located in a vessel space between the cryogenic environment of the electrical machine and the ambient temperature environment of the external device connected to the drive shaft;

said series-connected concentric cylinders including a first, a second and a third concentric cylinder concentrically positioned within each other in alignment with the longitudinal axis of the rotating shaft assembly, wherein said first concentric cylinder having a first end and a second end at opposite ends of the first concentric cylinder, said first end located proximate to the first adapter hub assembly and said second end located proximate to the second adapter hub assembly and said first cylinder being positioned inside the second and the third concentric cylinders, said first end of the first concentric cylinder being coupled to the rotor shaft of the superconducting machine through the first adapter hub assembly and said first end not being directly connected to the second concentric cylinder;

said second concentric cylinder having a first end and a second end at opposite ends of the second concentric cylinder, said first end located proximate to the first adapter hub assembly and said second end located proximate to the second adapter hub assembly and said second cylinder being positioned inside the third concentric cylinder, said second end of the second concentric cylinder being connected to the second end of the first concentric cylinder creating a substantially uniform first open-ended gap between the first and second cylinders that extends the length of the first cylinder without intermediate joint connections and said second end of the second cylinder not being directly connected to the third cylinder, said third concentric cylinder having a first end and a second end at opposite ends of the third concentric cylinder, said first end located proximate to the first adapter hub assembly and said second end located proximate to the second adapter hub assembly and said third cylinder being positioned outside the second concentric cylinder, said first end of the third concentric cylinder being connected to the first end of the second concentric cylinder creating a substantially uniform open-ended second gap between the second and third cylinders that extends the length of the second cylinder without intermediate joint connections, said second end of the third cylinder being coupled to the drive shaft that transmits rotational torque in the ambient temperature environment through the second adapter assembly, said plurality of concentric cylinders reducing the introduction of heat to the cryogenic environment of the superconducting machine.

2. The shaft of claim 1 wherein at least one concentric cylinder is a titanium alloy.

3. The shaft of claim 1 wherein at least one concentric cylinder is a filament-reinforced composite material.

4. The shaft of claim 1 wherein at least one concentric cylinder is an alloy comprising substantial amounts of iron, nickel, and chromium.

5. The shaft of claim 1 wherein one of the concentric cylinders is coupled to another concentric cylinder by a metallic joint.

6. The shaft of claim 1 wherein one of the concentric cylinders is coupled to another component by interlocking structural fingers.

7. The shaft of claim 1 wherein the vessel is a sealed vacuum vessel having a plurality of seal assemblies.

8. The shaft of claim 1 wherein thermal insulation is placed in said first or second gaps created between said concentric cylinders.

9. The shaft of claim 1 wherein the coldest concentric cylinder is coupled to the rotor shaft of superconducting machine.

10. A rotating shaft assembly for a cryogenic electrical machine:
a plurality of series-connected concentric cylinders each having their center altitude axis positioned in longitudinal alignment with the longitudinal axis of the rotating shaft assembly, said concentric cylinders being located in a vessel space between a cryogenic environment of a rotor shaft of the electrical machine and an ambient temperature environment of a drive shaft of an external device,
said series-connected concentric cylinders including a first, a second and a third concentric cylinder concentrically positioned within each other in alignment with the longitudinal axis of the rotating shaft assembly, each cylinder having its own longitudinal axis positioned in alignment with the longitudinal axis of the rotating shaft assembly, said concentric cylinders transmitting rotational torque for the machine;
said first concentric cylinder having a first end and a second end at opposite ends of the first concentric cylinder, said first end located proximate to the rotor shaft of the electrical machine and said second end located proximate to the drive shaft of the external device, said first cylinder being positioned inside the second and the third concentric cylinders, said first end of the first concentric cylinder being coupled to the rotor shaft of the superconducting machine and said first end of the first concentric cylinder not being directly connected to the second cylinder;
said second concentric cylinder having a first end and a second end at opposite ends of the second concentric cylinder, said first end located proximate to the rotor shaft of the electrical machine and said second end located proximate to the drive shaft of the external device and said second cylinder being positioned inside the third concentric cylinder, said second end of the second concentric cylinder being connected to the second end of the first concentric cylinder creating a substantially uniform first open-ended gap between the first and second cylinders that extends the length of the first cylinder without intermediate joint connections and said second end of the second cylinder not being directly connected to the third cylinder,
said third concentric cylinder having a first end and a second end at opposite ends of the third concentric cylinder, said first end located proximate to the rotor shaft of the electrical machine and said second end located proximate to the drive shaft of the external device and said third cylinder being positioned outside the second concentric cylinder, said first end of the third concentric cylinder being connected to the first end of the second concentric cylinder creating a substantially uniform open-ended second gap between the second and third cylinders that extends the length of the second cylinder without intermediate joint connections, said second end of the third concentric cylinder being coupled to the drive shaft that transmits rotational torque in the ambient temperature environment so that the plurality of concentric cylinders reduces the introduction of heat to the cryogenic environment of the superconducting machine.

11. The shaft of claim 10 wherein at least one concentric cylinder is a titanium alloy.

12. The shaft of claim 10 wherein at least one concentric cylinder is a filament-reinforced composite material.

13. The shaft of claim 10 wherein at least one concentric cylinder is an alloy comprising substantial amounts of iron, nickel, and chromium.

14. The shaft of claim 10 wherein one of the concentric cylinders are fused to another concentric cylinder by a metallic joint.

15. The shaft of claim 10 wherein one of the concentric cylinders is coupled to another component by interlocking structural fingers.

16. The shaft of claim 10 wherein the vessel space is a sealed vacuum vessel.

17. The shaft of claim 10 wherein thermal insulation is placed in said first or second gaps created between said concentric cylinders.

18. The shaft of claim 10 wherein the coldest concentric cylinder is coupled to the rotor shaft of superconducting machine.

19. A method of minimizing the introduction of heat into a cryogenic environment of a superconducting machine:
providing a vessel space between a rotor shaft in the cryogenic environment of the superconducting machine and a drive shaft of an external device in an ambient temperature environment external to the superconducting machine,
providing a plurality of series-connected concentric cylinders each having a longitudinal axis positioned in alignment with a longitudinal axis of the rotor shaft and drive shaft, said concentric cylinders being located in the vessel space between the cryogenic environment of the rotor shaft of the superconducting machine and the ambient temperature environment of the drive shaft of an external device, said series-connected concentric cylinders including a first, a second and a third concentric cylinder concentrically positioned within each other and each cylinder having their respective longitudinal axis positioned in alignment with the longitudinal axis of the rotor shaft, said concentric cylinders transmitting rotational torque for the machine;
connecting a first concentric cylinder to the rotor shaft from the superconducting machine, said first concentric cylinder having a first end and a second end at opposite ends of the first concentric cylinder, said first end located proximate to the rotor shaft of the superconducting machine and said second end located proximate to the drive shaft of the external device, said first cylinder being positioned inside the second and the third concentric cylinders, coupling directly said first end of the first concentric cylinder to the rotor shaft of the superconducting machine and said first end of the first concentric cylinder not being directly connected to the second cylinder, connecting the first concentric cylinder to said second concentric cylinder, said second concentric cylinder having a first end and a second end at opposite ends of the second concentric cylinder, said first end located proximate to the rotor shaft of the superconducting machine and said second end located proximate to the drive shaft of the external device and said second cylinder being positioned inside the third concentric cylinder, said second end of the second concentric cylinder being connected to the second end of the first concentric cylinder creating a substantially uniform first open-ended gap between the first and second cylinders that extends the length of the first cylinder without intermediate joint connections and said second end of the second cylinder not being directly connected to the third cylinder, coupling the third cylinder to an external drive rotor shaft that transmits rotational torque in the ambient temperature environment, said third concentric cylinder having a first end and a second end at opposite ends of the third concentric cylinder, said first end located proximate to the rotor shaft of the superconducting machine and said second end located proximate to the drive shaft of the external device and said third cylinder being positioned outside the second concentric cylinder, said first end of the third concentric cylinder being connected to the first end of the second concentric cylinder creating a substantially uniform open-ended second gap between the second and third cylinders that extends the length of the second cylinder without intermediate joint connections, said second end of the third concentric cylinder being coupled to the drive shaft that transmits rotational torque in the ambient temperature environment so that the plurality of concentric cylinders reduces the introduction of heat to the cryogenic environment of the superconducting machine.

20. The method of claim 19 wherein at least one concentric cylinder is a titanium alloy.

21. The method of claim 19 wherein at least one concentric cylinder is a filament-reinforced composite material.

22. The method of claim 19 wherein at least one concentric cylinder is an alloy comprising substantial amounts of iron, nickel, and chromium.

23. The method of claim 19 wherein one of the concentric cylinders is coupled by a metallic joint to another concentric cylinder.

24. The method of claim 19 wherein one of the concentric cylinders in the assembly is coupled to another component by interlocking structural fingers.

25. The method of claim 19 wherein the vessel space is a sealed vacuum vessel.

26. The method of claim 19 wherein thermal insulation is placed in said first or second gaps created between said concentric cylinders.

27. The method of claim 19 wherein the coldest concentric cylinder is coupled to the rotor shaft from the superconducting machine.

* * * * *

UNITED STATES PATENT AND TRADEMARK OFFICE
CERTIFICATE OF CORRECTION

PATENT NO. : 7,791,229 B2
APPLICATION NO. : 12/217304
DATED : September 7, 2010
INVENTOR(S) : Carl L. Goodzeit It is certified that error appears in the above-identified patent and that said Letters Patent is hereby corrected as shown below:

Title page, item [60] Related U.S. Application Data, replace "Feb. 4, 2008." with "Apr. 2, 2008."

Signed and Sealed this

Twenty-first Day of December, 2010

David J. Kappos
*Director of the United States Patent and Trademark Office*